March 4, 1924.
R. B. DOWLER
1,485,771
AUTOMOBILE FUEL GAUGE CONTROL
Filed July 24, 1923
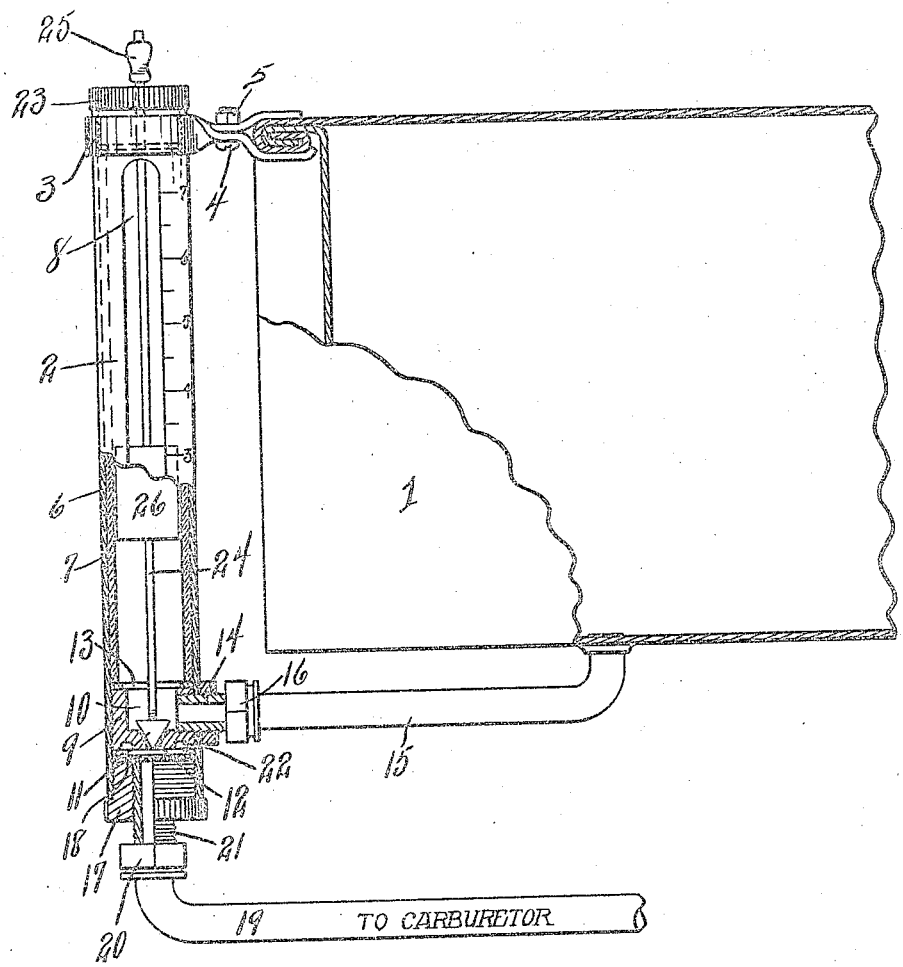
Inventor
RALPH B DOWLER
By A. R. Jackson
Attorney Patented Mar. 4, 1924.

1,485,771

UNITED STATES PATENT OFFICE.

RALPH B. DOWLER, OF FORT WORTH, TEXAS.

AUTOMOBILE FUEL-GAUGE CONTROL.

Application filed July 24, 1923. Serial No. 653,433.

*To all whom it may concern:*

Be it known that I, RALPH B. DOWLER, a citizen of the United States, residing at Fort Worth, in the county of Tarrant and State of Texas, have invented certain new and useful Improvements in Automobile Fuel-Gauge Controls, of which the following is a specification.

My invention relates to oil or gasoline gauges for motor vehicles; and the object is to provide a simple gauge which can be easily and quickly attached to a gasoline tank at a relatively small cost and which will serve to prevent a person from running his vehicle until the gasoline is used up. One advantage of the improved gauge is that it can be attached to any gasoline tank of ordinary construction and will be an efficient warning to the driver that the gasoline is getting low in the tank. Other objects and advantages will be fully explained in the following description and the invention will be more particularly pointed out in the claims.

Reference is had to the accompanying drawing which forms a part of this application.

The figure of drawings is a broken sectional elevation of a gasoline tank and the gauge attached thereto.

A tank 1 is shown and a gauge 2 is attached thereto by a clamp 3 at the upper end and secured to the edge members of the tank by a bolt 4 with a nut 5. At the lower end, the gauge is secured to the tank by the pipe connections. The gauge is composed of two members,—a metallic casing 6 and an inner tube or reservoir 7 of transparent or translucent material which is made of hard and practically non-breakable material. The indicating scale may be made on the metallic casing 6 which has a vertical slot 8 for exposing to view the transparent tube 7. A plug 9 is screwed into the casing 6 and a cavity 10 is made therein for gasoline and for the operation of a valve 11 which is adapted to close the passage 12 through the bottom of the plug. The transparent tube 7 is supported by the plug 9 with a gasket 13 interposed between the end of the tube and the plug. A perforated plug connection 14 is screwed through the casing 6 and into the plug 9 and communicating with the cavity 10. A pipe or tube 15 is connected to the plug 14 by a union 16 and the tube is connected to the tank 1 for feeding gasoline therefrom. A perforated plug connection 17 is screwed into the lower end of the casing 6 and a gasket 18 is interposed between the casing 6 and the plug 17. The plug 17 closes the end of the casing 6. A feed pipe 19 is connected to the plug 17 by a union 20 and by a connection 21 which is screwed into the plug 17. A circular cavity 22 is formed in the lower side of the plug 9.

The casing 6 may be closed at the top by a cap 23. The valve 11 is provided with a stem 24 which moves freely through the cap 23. The valve 11 may be set to close the passage from the tank 1 through pipes 15 and 19 and their connections at any required measurement. The valve may be set to close the passage when there is left 1, 2, 3, or more gallons of gasoline in the tank. A clamp 25 may be mounted on the stem 24 to position the valve 11 at any required adjustment. A float 26 will follow the gasoline down and let the valve 11 go down and close the passage for the gasoline from the tank 1. A party will know how much gasoline he has when the valve closes the passage. He can then raise the valve and support it with the clamp 25 until he can drive to a gasoline station.

What I claim, is,—

1. A gauge for gasoline tanks comprising a metallic casing provided with a vertical slot therein, a feed passage plug mounted therein, a transparent tube mounted in said casing and resting on said plug, a pipe connected to the gasoline tank and to said plug and forming communication for said tank with said tube, a feed pipe operatively connected to said plug, a valve adapted to close the passage from said plug to said feed pipe, and a float for controlling the movement of said valve and permitting said valve to close the feed passage at a predetermined measurement of gasoline.

2. A gauge for gasoline tanks comprising a metallic casing provided with a vertical slot therein and a scale marked on the casing, a feed passage plug mounted in the lower end of said casing, a transparent tube mounted in said casing and resting on said plug, a pipe connected to said tank and to said plug and forming with said plug communication for said tank with said tube, a feed pipe operatively connected to said plug, a valve adapted to close the passage from said plug to said feed pipe, and provided with a stem projecting upwardly in said tube, and a float for controlling the movement of said valve to permit said valve to close said feed passage at a predetermined measurement of gasoline.

3. A gauge for gasoline tanks comprising a tube vertically disposed and operatively connected to a gasoline tank and provided with passage way communication with the interior of said tank for maintaining gasoline therein at the same level as in the tank and means for indicating the height of gasoline therein, a feed pipe operatively connected to said passage way, a valve adapted to close said passage way to said feed pipe, means for positioning said valve in said tube to close said passage way at a predetermined measurement of gasoline in said tank, and means for holding said valve open after the gasoline has been used down to the predetermined measurement of gasoline.

In testimony whereof, I set my hand, this 21st day of July, 1923.

RALPH B. DOWLER.